(12) United States Patent
Jacobson et al.

(10) Patent No.: US 10,432,952 B2
(45) Date of Patent: Oct. 1, 2019

(54) SYSTEM AND METHODS FOR FIXED-POINT APPROXIMATIONS IN DISPLAY STREAM COMPRESSION (DSC)

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Ike Ikizyan, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 15/353,468

(22) Filed: Nov. 16, 2016

(65) Prior Publication Data

US 2017/0150158 A1 May 25, 2017

Related U.S. Application Data

(60) Provisional application No. 62/257,604, filed on Nov. 19, 2015, provisional application No. 62/264,067, filed on Dec. 7, 2015, provisional application No. 62/305,314, filed on Mar. 8, 2016.

(51) Int. Cl.
| | |
|---|---|
| *H04N 19/152* | (2014.01) |
| *H04N 19/30* | (2014.01) |
| *H04N 19/176* | (2014.01) |
| *H04N 19/149* | (2014.01) |
| *H04N 19/115* | (2014.01) |
| *H04N 19/124* | (2014.01) |

(52) U.S. Cl.
CPC .......... *H04N 19/30* (2014.11); *H04N 19/115* (2014.11); *H04N 19/124* (2014.11); *H04N 19/149* (2014.11); *H04N 19/152* (2014.11); *H04N 19/176* (2014.11)

(58) Field of Classification Search
CPC .............................. H04N 19/30; H04N 19/115
USPC ......................................................... 375/240
See application file for complete search history.

(56) References Cited

U.S. PATENT DOCUMENTS

| | | | |
|---|---|---|---|
| 9,866,853 B2 | 1/2018 | Thirumalai et al. | |
| 9,930,346 B2 | 3/2018 | Thirumalai et al. | |
| 2010/0124279 A1 | 5/2010 | Reddy et al. | |
| 2011/0090960 A1* | 4/2011 | Leontaris ............ | H04N 19/103 375/240.12 |

(Continued)

OTHER PUBLICATIONS

International Preliminary Report on Patentability from corresponding PCT Application Serial No. PCT/US2016/062455 dated May 31, 2018 (14 pp).

(Continued)

Primary Examiner — William C Vaughn, Jr.
Assistant Examiner — Jerry T Jean Baptiste
(74) Attorney, Agent, or Firm — Shumaker & Sieffert, P.A.

(57) ABSTRACT

Provided are systems and methods for used fixed-point instead of floating point techniques in order to calculate various parameters for coding video data, including target rate, QP adjustment, buffer fullness, a Lagrangian parameters for a bitrate, and/or a Lagrangian parameter for the fullness of the buffer. By determining one or more of the parameters using fixed-point, hardware implementation costs may be decreased.

29 Claims, 11 Drawing Sheets

(56) References Cited

U.S. PATENT DOCUMENTS

2014/0092960 A1* 4/2014 MacInnis ............. H04N 19/149
375/240.03
2014/0307800 A1* 10/2014 Sole Rojals ......... H04N 19/176
375/240.18
2016/0301939 A1 10/2016 Thirumalai et al.

OTHER PUBLICATIONS

International Search Report and Written Opinion—PCT/US2016/062455—ISA/EPO—dated Mar. 31, 2017.
"VESA Display Stream Compression (DSC) Standard, Version 1.1," Not Known, No. VESA_DSC_V1_1, Aug. 1, 2014 (Aug. 1, 2014), XP030001644; 125 pages.
Partial International Search Report—PCT/US2016/062455—ISA/EPO—dated Feb. 10, 2017.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

SYSTEM AND METHODS FOR FIXED-POINT APPROXIMATIONS IN DISPLAY STREAM COMPRESSION (DSC)

CROSS REFERENCE TO RELATED APPLICATION(S)

This application claims the benefit of priority under 35 U.S.C. § 119(e) of U.S. Provisional Patent Application No. 62/257,604 filed on Nov. 19, 2015, U.S. Provisional Patent Application No. 62/264,067 filed on Dec. 7, 2015, and U.S. Provisional Patent Application No. 62/305,314 filed on Mar. 8, 2016, the entire contents of which are hereby incorporated by reference in their entirety herein and should be considered a part of this application.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices. The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, an apparatus for coding video data is provided. The apparatus can include a memory for storing the video data, the memory including a buffer. The apparatus can also include a hardware processor operationally coupled to the memory. The processor may be configured to receive the video data to be coded. The processor may be further configured to, for a block to be coded, determine one or more of: a target rate, a flatness quantization parameter (QP), a fullness of the buffer, a Lagrangian parameter for a bitrate, or a Lagrangian parameter for the fullness of the buffer, the determination based at least in part on one or more fixed-point approximation operations.

In another aspect, a method of coding video data is provided. The method can include storing the video data in a memory, the memory including a buffer. The method may also include receiving the video data to be coded. The method can further include, for a block to be coded, determining one or more of: a target rate, a flatness quantization parameter (QP), a fullness of the buffer, a Lagrangian parameter for a bitrate, or a Lagrangian parameter for the fullness of the buffer, said determining based at least in part on one or more fixed-point approximation operations.

In another aspect, an apparatus for coding video data is provided. The apparatus comprises a memory for storing the video data, the memory including a buffer. The apparatus further comprises a hardware processor operationally coupled to the memory and configured to determine and store a scaling parameter based upon a total number of pixels within a slice of video data. The hardware processor is further configured to determine and store a data structure associating a plurality of input values with their reciprocal values. The hardware processor is further configured to receive the video data to be coded, the video data comprising at least one slice divided into a plurality of blocks. The hardware processor is further configured to determine a threshold value based upon the stored scaling parameter. The hardware processor is further configured to for a block of the slice to be coded, in response to a determination that a number of remaining pixels in the slice is less than the threshold value, update the scaling parameter and determine an updated threshold value based upon the scaling factor. The hardware processor is further configured to perform one or more fixed-point approximation operations to determine a target rate for the block, based upon a reciprocal value associated with the number of remaining pixels scaled based upon the scaling factor, wherein the reciprocal value is determined using the stored data structure.

In another aspect, a computer implemented method for determining target rates for coding blocks of video data is provided. The method comprises determining and storing a scaling parameter based upon a total number of pixels within a slice of video data. The method further comprises determining and storing a data structure associating a plurality of input values with their reciprocal values. The method further comprises receiving the video data to be coded, the video data comprising at least one slice divided into a plurality of blocks. The method further comprises determining a threshold value based upon the stored scaling parameter. The method further comprises, for a block of the slice to be coded, in response to a determination that a number of remaining pixels in the slice is less than the threshold value, updating the scaling parameter and determining an updated threshold value based upon the scaling factor. The method further comprises performing one or more fixed-point approximation operations to determine a target rate for the block, based upon a reciprocal value associated with the number of remaining pixels scaled based upon the scaling factor, wherein the reciprocal value is determined using the stored data structure.

In another aspect, an apparatus is provided, comprising means for determining and storing a scaling parameter based upon a total number of pixels within a slice of video data. The apparatus further comprises means for determining and storing a data structure associating a plurality of input values with their reciprocal values. The apparatus further comprises means for receiving the video data to be coded, the video data comprising at least one slice divided into a plurality of blocks. The apparatus further comprises means for determining a threshold value based upon the stored scaling parameter. The apparatus further comprises, for a block of the slice to be coded, in response to a determination that a number of remaining pixels in the slice is less than the threshold value, means for updating the scaling parameter and determining an updated threshold value based upon the scaling factor. The apparatus further comprises means for performing one or more fixed-point approximation operations to determine a target rate for the block, based upon a reciprocal value associated with the number of remaining pixels scaled based upon the scaling factor, wherein the reciprocal value is determined using the stored data structure.

In another aspect, a non-transitory computer readable storage medium is provided. The storage medium has stored thereon video data relating to a slice of an image, the slice comprising one or more blocks. The storage medium further has stored thereon instructions that, when executed, cause a processor of a device to determine and store a scaling parameter based upon a total number of pixels within a slice of video data. The storage medium further has stored thereon instructions that cause the processor to determine and store a data structure associating a plurality of input values with their reciprocal values. The storage medium further has stored thereon instructions that cause the processor to receive the video data to be coded, the video data comprising at least one slice. The storage medium further has stored thereon instruction that cause the processor to determine a threshold value based upon the stored scaling parameter. The storage medium further has stored thereon instructions that cause the processor to, for a block of the slice to be coded, in response to a determination that a number of remaining pixels in the slice is less than the threshold value, update the scaling parameter and determine an updated threshold value based upon the scaling factor. The storage medium further has stored thereon instructions that cause the processor to perform one or more fixed-point approximation operations to determine a target rate for the block, based upon a reciprocal value associated with the number of remaining pixels scaled based upon the scaling factor, wherein the reciprocal value is determined using the stored data structure.

In another aspect, an apparatus for coding video data is provided. The apparatus comprises a memory for storing the video data, the memory including a buffer. The apparatus further comprises a hardware processor operationally coupled to the memory. The hardware process is configured to determine and store a first parameter value based upon a reciprocal of a maximum buffer size. The hardware processor is further configured to receive the video data to be coded, the video data comprising at least one slice divided into a plurality of blocks. The hardware processor is further configured to, for a block of the slice to be coded, scale the first parameter based upon a first value indicating a number of bits used to represent buffer fullness, and a second value indicating precision for which to calculate buffer fullness. The hardware processor is further configured to perform one or more fixed-point approximation operations to determine a buffer fullness value for the block, based upon the scaled first parameter.

In another aspect, an apparatus for coding video data is provided. The apparatus comprises a memory for storing the video data, the memory including a buffer. The apparatus further comprises a hardware processor operationally coupled to the memory. The hardware process is configured to determine and store a data structure associating buffer fullness values with quantization parameter (QP) adjustment values. The hardware processor is further configured to receive the video data to be coded, the video data comprising at least one slice divided into a plurality of blocks. The hardware processor is further configured to, for a block of the slice to be coded, determine whether the block contains a transition between a complex region and a flat region, wherein complex regions have a higher complexity in comparison to flat regions. The hardware processor is further configured to, in response to a determination that the block contains a transition, shift a buffer fullness value based upon a number of bits used to code the buffer fullness value and a number of bits to be used to code a QP adjustment value. The hardware processor is further configured to perform one or more fixed-point approximation operations to determine a QP adjustment value for the block, based upon the stored data structure and the shifted buffer fullness value. The hardware processor is further configured to set a QP of the block to the determined QP adjustment value.

In another aspect, an apparatus for coding video data is provided. The apparatus comprises a memory for storing the video data. The apparatus further comprises a hardware processor operationally coupled to the memory. The hardware process is configured to determine and store a first scaling parameter based upon a maximum number of bits that can be used to code a block of video data. The hardware processor is further configured to determine and store a data structure associating numbers of bits used to code blocks of video data with Lagrangian parameters for bitrate. The hardware processor is further configured to receive the video data to be coded, the video data comprising at least one slice divided into a plurality of blocks. The hardware processor is further configured to, for a block of the slice to be coded, perform one or more fixed-point approximation operations determine a Lagrangian for a bitrate of the block using the data structure, based upon a number of bits to code the block adjusted by the first scaling parameter.

In another aspect, an apparatus for coding video data is provided. The apparatus comprises a memory for storing the video data, the memory including a buffer. The apparatus further comprises a hardware processor operationally coupled to the memory. The hardware process is configured to determine and store a data structure associating buffer fullness values with Lagrangian values for buffer fullness values. The hardware processor is further configured to receive the video data to be coded, the video data comprising at least one slice divided into a plurality of blocks. The hardware processor is further configured to, for a block of the slice to be coded, scale a calculated buffer fullness value of the block based upon a first parameter indicating a number of bits used to code the buffer fullness value and a second parameter indicating a number of bits used to code an index of the data structure. The hardware processor is further configured to perform one or more fixed-point approximation operations to determine a Lagrangian value for the buffer fullness value using the stored data structure and the scaled buffer fullness value.

DETAILED DESCRIPTION

Figure 1A:
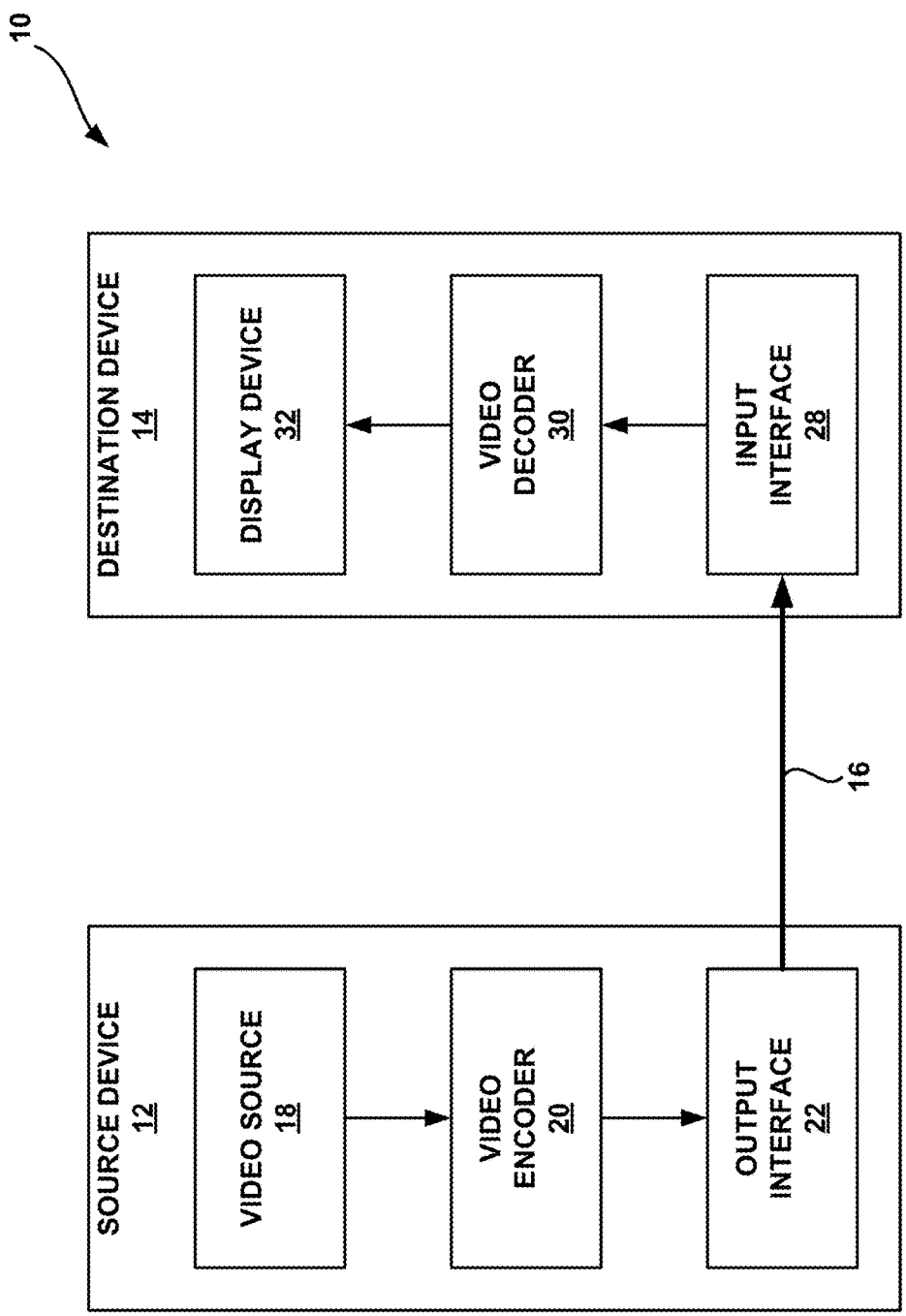
FIG. 1A is a block diagram illustrating an example video encoding and decoding system that may utilize techniques in accordance with aspects described in this disclosure.

In general, this disclosure relates to methods of improving video compression techniques such as, for example, display stream compression (DSC). More specifically, the present disclosure relates to systems and methods for fixed-point approximation of rate control parameters.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

In DSC, certain rate control parameters, such as buffer fullness and a lambda value based on the buffer fullness, may be determined using one or more divisions or division operations. A division or division operation can refer to an operation involving the division operator (e.g., "/"). However, use of division operations may lead to complexity and difficulty in hardware implementation.

In order to address these and other challenges, the techniques described in the present disclosure can determine or calculate various rate control parameters using fixed-point approximation. Examples of rate control parameters can include, but are not limited to: target rate, flatness QP, buffer fullness, a lambda value for bitrate, a lambda value for buffer fullness, etc. Lambda values may also be referred to as Lagrangian parameters or lagrangrian parameters. By using fixed-point approximation, the techniques can reduce or eliminate use of division operations in calculating rate control parameters, which can reduce complexity and cost of hardware implementation.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques. Advanced DSC is being developed, for example, in order to provide compression ratios of 4:1 or higher. Compression ratios of 4:1 or higher may be used for mobile devices, e.g., for high resolution displays such as 4K.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
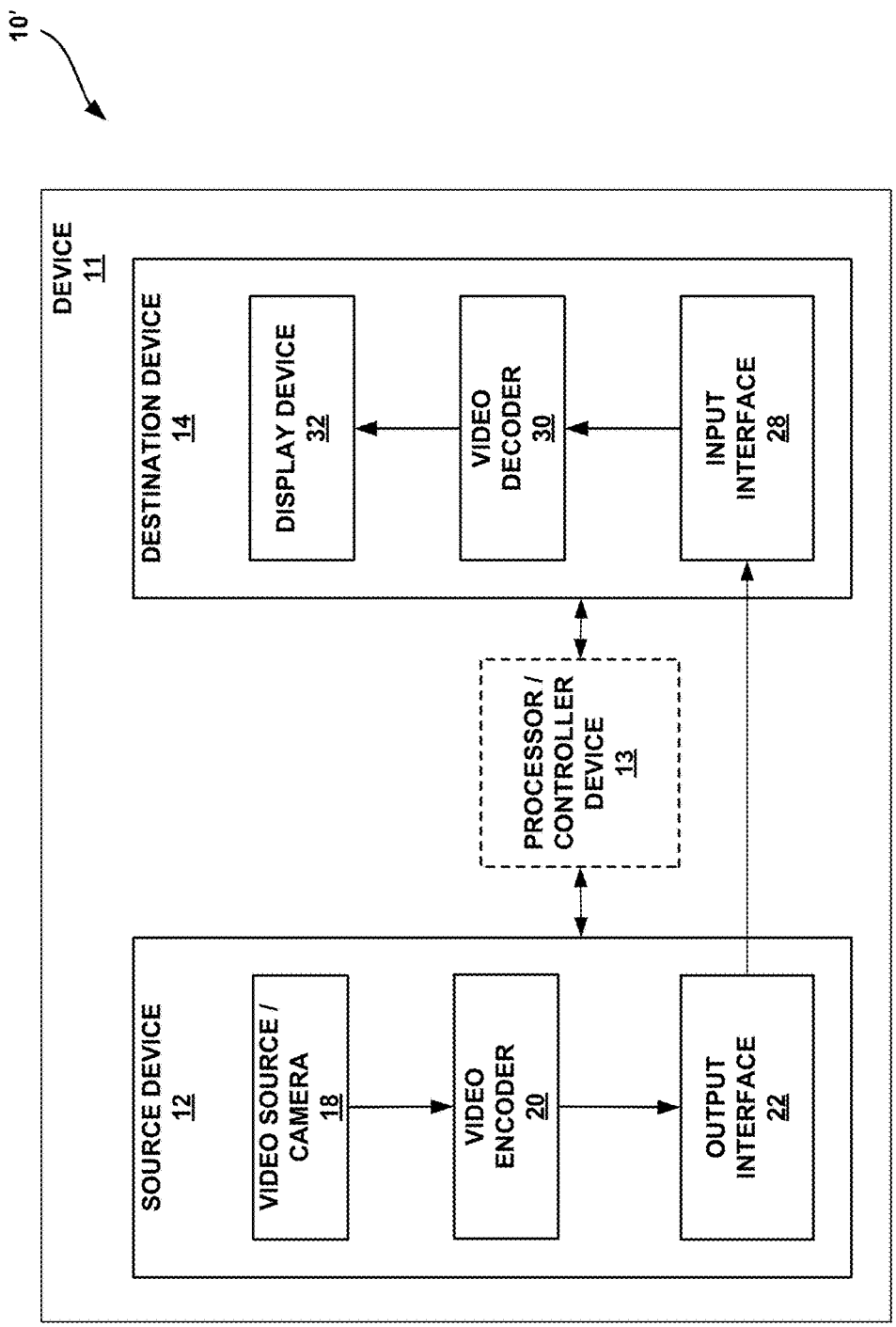
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
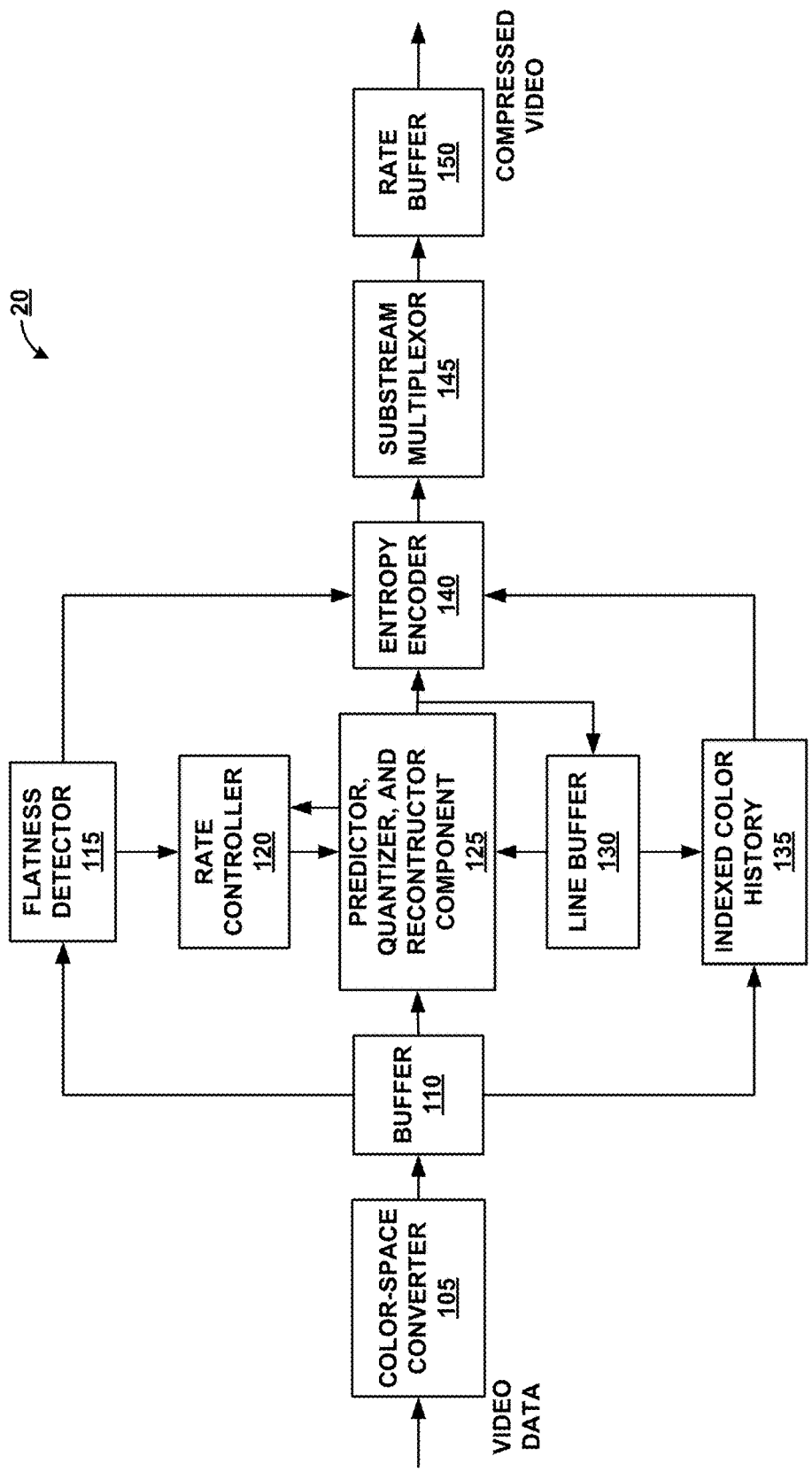
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. The predictor, quantizer, and reconstructor component 125 may be configured to predict (e.g., encode or decode) the block of video data (or any other unit of prediction) by performing the methods and techniques of the present disclosure.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
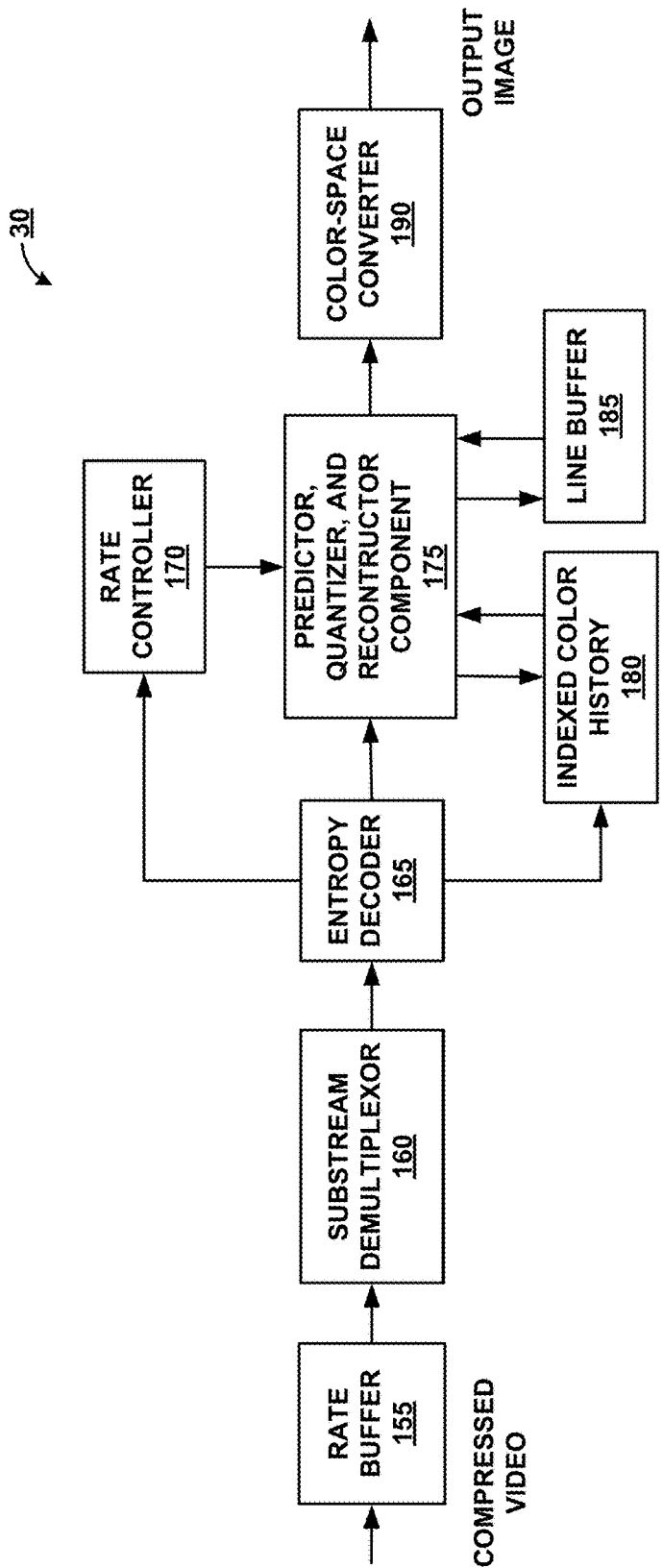
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Quantization Parameter (QP)

As described above, video coding may include the quantization of the video data via, for example, the predictor, quantizer, and reconstructor component 125. Quantization may introduce loss into a signal and the amount of loss can be controlled by the QP determined by the rate controller 120. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant. This may differ for partial slices, which can occur if the image height is not divisible by the slice height. For example, an image of size 1280×720 with slice height of 108 will have 6 slices of height 108 and one partial slice of height 72 (=720−(6*108)).

Advanced DSC slice dimensions can be specified using variables or parameters slice Width×slice Height, where slice Width and slice Height are configurable. Slice Height can be configured to a desired value, for example, 16, 32, 108, etc. Slice Width can be configured using a parameter N, which determines the number of slices in a line, and it is assumed that the number of pixels per line in each slices is equal, e.g., slice Width=image Width/N. Image Width can be a variable or parameter representing the width of an image.

Fixed-Point Approximation for Rate Control Parameters

The Display Stream Compression v1.x standard supports an average compression ratio of 3:1 and has recently been finalized and ratified by VESA. However, as display resolutions are increasing faster than the physical transmission protocols can support them, DSC v1.x may be unsuitable for many types of content (for example, 4K video at 10 bpp, 4K video at 120 Hz, and 8K video at any bit depth or refresh rate). To support such use cases, a visually-lossless codec with average compression rate of at least 4:1 can be provided. In certain embodiments, the codec may be referred to as Advanced DSC codec ("ADSC").

According to certain aspects, the proposed DSC codec is block-based and includes a multitude of coding modes, each aimed at compressing different types of content. Mode selection may be handled by a rate-control mechanism which aims to select the best mode for each block by considering both the rate and the distortion of the mode. The rate-control mechanism may be supported by an HRD buffer model, and it can be the design requirement of the codec that said buffer is never in a state of underflow (e.g., fewer than zero bits in the buffer) or overflow (e.g., buffer size has increased past a set maximum size).

In DSC, certain rate control parameters, such as buffer fullness and a lambda value based on the buffer fullness, may be determined using one or more divisions or division operations. A division or division operation can refer to an operation involving the division operator (e.g., "/"). However, use of division operations may lead to complexity and difficulty in hardware implementation (e.g., division operations involving division by an arbitrary number, etc.). Use of complicated functions or computations can also lead to complexity and difficulty in hardware implementation.

In order to address these and other challenges, the techniques described in the present disclosure can eliminate or reduce use of division operations and other complex computations in determining or calculating various rate control parameters. For example, the techniques can determine or calculate various rate control parameters using fixed-point approximation. Examples of rate control parameters can include, but are not limited to: target rate, flatness QP, buffer fullness, a lambda value for bitrate, a lambda value for buffer fullness, etc. Lambda values may also be referred to as Lagrangian parameters or lagrangrian parameters. By using fixed-point approximation, the techniques can reduce or eliminate use of division operations and/or other complex operations in calculating rate control parameters, which can reduce complexity and cost of hardware implementation. For example, many values can be precomputed, and only multiplications, additions, and bitshifting may be used to simplify operations. Lookup tables (LUTs) may also be used to simplify operations. As used here, the term LUT may be used to refer to any type of data structure that may be used to store precomputed values. Details relating to certain aspects are provided below.

In related aspects, disclosed herein is a DSC coder that provides low cost, fixed rate visually lossless compression. The coder is designed based on a block-based approach (e.g., with block size P×Q) and may be implemented with one or more of a multitude of coding modes. For example, available coding options for each block include transform mode (e.g., DCT, Hadamard), block prediction mode, differential pulse-code modulation (DPCM) mode, pattern mode, mid-point prediction (MPP) mode, and/or mid-point predication fall back (MPPF) mode. Several coding modes may be used in the coder to compress different types of content or images. For example, text images may be compressed via pattern mode, while a natural image may be captured via transform mode.

In further related aspects, a coding mode may be selected and utilized for each block from among a plurality of candidate coding modes based on a rate-control technique for selecting the optimal mode(s) for each block by considering both the rate and the distortion of the candidate mode. The rate-control technique may involve utilizing a buffer model, and a design consideration of the codec may include making sure that the buffer is not in a state of underflow (e.g., fewer than zero bits in the buffer) or overflow (e.g., buffer size has increased past a set/defined maximum size).

Buffer Fullness Calculation

In U.S. patent application Ser. No. 14/820,404, filed Aug. 6, 2015, which is incorporated herein by reference in its entirety, a method has been disclosed to calculate the buffer fullness (BF). In particular, according to certain aspects, BF is linearly decreased at a constant rate after coding some fixed number of blocks in a slice, in such a way that at the end of the slice, BF is 100% if BufferCurrent Size= maxBufferBitsAtSliceEnd, where maxBufferBitsAtSliceEnd denotes the maximum number of bits that can be contained in the rate buffer at the end of slice. More precisely, BF is calculated as:

$$BF = \frac{(bufferCurrentSize \cdot 100) + (bufferAdjSize \gg 1)}{bufferAdjSize} \quad \text{(eq. 1)}$$

where:
bufferAdjSize=BufferMaxSize−offset
offset=((bufferRateReductionPerBlock)·(numBlocksCoded−numBlocksTh))

Here, numBlocksCoded represents the number of blocks coded in the slice so far, and numBlocksTh is a threshold parameter that is configurable. The rate at which the buffer is linearly adjusted per block is calculated as:

$$bufferRateReductionPerBlock = \frac{diffSize}{TotalnumberofBlocksInSlice - numBlocksTh}$$

where diffSize=BufferMaxSize−maxBufferBitsAtSliceEnd.

Lambda Based on Buffer Fullness

Lagrangian parameters (also referred to as lambda or lambda values) may be used to compute cost functions which combine rate and distortion. For example:

Cost=Distortion+(λ×rate)

The value of the Lagrangian parameter may be adjusted based upon a state of the codec (e.g., buffer fullness value), as the trade-off between distortion and rate may be different for different regions. For example, the more full the rate buffer is (high buffer fullness), the more the rate of a specific mode may be penalized, as the buffer may not be able to accommodate blocks that are more expensive to code. In some embodiments, the Lagrangian may also be a function of a bitrate of the block (e.g., an increasing penalty as a function of the bitrate of the block).

In U.S. patent application Ser. No. 14/685,453, filed Apr. 13, 2015, which is incorporated herein by reference in its entirety, a lambda or Lagrangian value based on buffer fullness can be calculated based on the following equation:

$$\lambda(x) = \text{Max}\left(\Lambda, a_1 \cdot 2^{\frac{((x \cdot b_1) - c_1)}{d_1}}\right) \quad \text{(eq. 2)}$$

where $\{\Lambda, a_1, b_1, c_1, d_1\}$ are tunable parameters. $x \in [0,1]$ and x is calculated as $$x = \frac{BF}{100},$$

where BF is represented here as a percentage, e.g., percentage of bits occupied in the buffer. However, the equation is not easily implementable in hardware as it requires division.

Fixed-Point Approximation

While software algorithms used to calculate the above terms (e.g., buffer fullness BF, lambda, and/or the like) to high precision using floating point arithmetic, such types of calculations may be more difficult to implement on hardware and ASIC based designs. According to some aspects, the techniques of the present disclosure are intended to decrease the hardware implementation cost of the ADSC codec. As discussed above, computing an arbitrary division of the form a/b, or a complicated function like $$2^{\frac{(a \cdot x + b)}{c}}$$

is difficult and requires floating point arithmetic in general. In order to address these and other challenges, the techniques can replace such computations with a fixed-point approximation which can easily be computed in hardware, and without requiring computation of division functions, root functions, and/or other potentially complicated floating point functions.

In one example, the techniques can provide five fixed-point algorithm changes in the ADSC codec as follows:
Target rate: changes to the way this quantity is calculated
Flatness QP: changes to the way this quantity is calculated
Buffer fullness: changes to the way this quantity is calculated
$\lambda_{bitrate}$: precompute λ values and store in a lookup table (LUT)
$\lambda_{BF}$: compute λ using a fixed-point approximation In another example, the methods of computing the two λ functions could be switched. For instance, a LUT could be used to obtain $\lambda_{BF}$ while a fixed-point approximation could be used for $\lambda_{bitrate}$. In the first example, a LUT is used $\lambda_{bitrate}$ because $\lambda_{BF}$ may be computed only once per block, while $\lambda_{bitrate}$ may be computed once per block for each mode (e.g., 6 times per block, using the modes currently supported in ADSC). Therefore, the LUT approach, which can require slightly less total arithmetic (e.g., fewer operations) in exchange for more storage, may be more appropriate. On the other hand, more operations can be afforded or used for $\lambda_{BF}$ since it is computed less frequently.

Target Rate

In some embodiments, the target rate can be determined using fixed-point approximation as described below. Previously, the target rate was calculated using the floating point ratio shown below, where #bits is the number of bits remaining in a slice, and #px is the number of pixels remaining in a slice. Using the calculated floating point ratio, the bits remaining in a slice can evenly distributed over the blocks/pixels remaining in a slice. The factor of 16 is used because the target rate is computed per block (e.g., 16 pixels/block) rather than per-pixel, although it is understood that in other embodiments each block may have a number of pixels other than 16.

$$TR_{float} = \frac{16 \cdot \#bits}{\#px}$$

However, this involves a floating point calculation between two large integers. In addition, because #px indicating the number of pixels remaining in a slice changes as pixels within the slice are processed, it may be impractical to pre-compute the calculation.

To avoid such floating point calculation, the calculation may use a fixed-point divider implementation, which can be denoted as $TR_0$. In addition, after the fixed-point target rate approximation $TR_0$ is determined, a secondary LUT may be used to adjust the target rate approximation $TR_0$ based on the current state of the buffer fullness:

$$TR_{fixed} = TR_0 + \delta(BF)$$

The fixed-point approximation may be computed for $TR_0$ in a similar way as described in "Integer Division Using Reciprocals," Robert Alverson, Proceedings of the Tenth Symposium on Computer Arithmetic, pp. 186-190, 1991. Given the following parameters:

$B_0$: total bits allocated to the slice
$P_0$: total pixels in the slice
$n_0$: bits used to define granularity of the LUT
$n_1$: LUT entries are stored with $n_1$ bits of additional precision In some embodiments, the algorithm for computing $TR_0$ may be as follows:

1. Precompute a scaling factor N and store in the codec's list of parameters. As illustrated below, the scaling factor N may be based upon the total number of pixels in a slice $P_0$:

$$N = 1 + \lfloor \log_2(P_0) \rfloor$$

Because the total number of pixels in the slice ($P_0$) is a known constant value, the scaling factor N is also a constant value that can be precomputed and stored prior to runtime.

2. Precompute an LUT ($LUT_{reciprocal}$) for a reciprocal function $$f(p) = \frac{1}{p}$$

using $2^{n_0-1} = 1 << (n_0-1)$ entries, wherein p may correspond to a scaled version of a number of bits remaining in the slice P. This LUT is stored using $n_1$ bits of precision, such that each entry is actually giving the ratio $$f(p) = \frac{1 << n_1}{p}.$$

Figure 3:
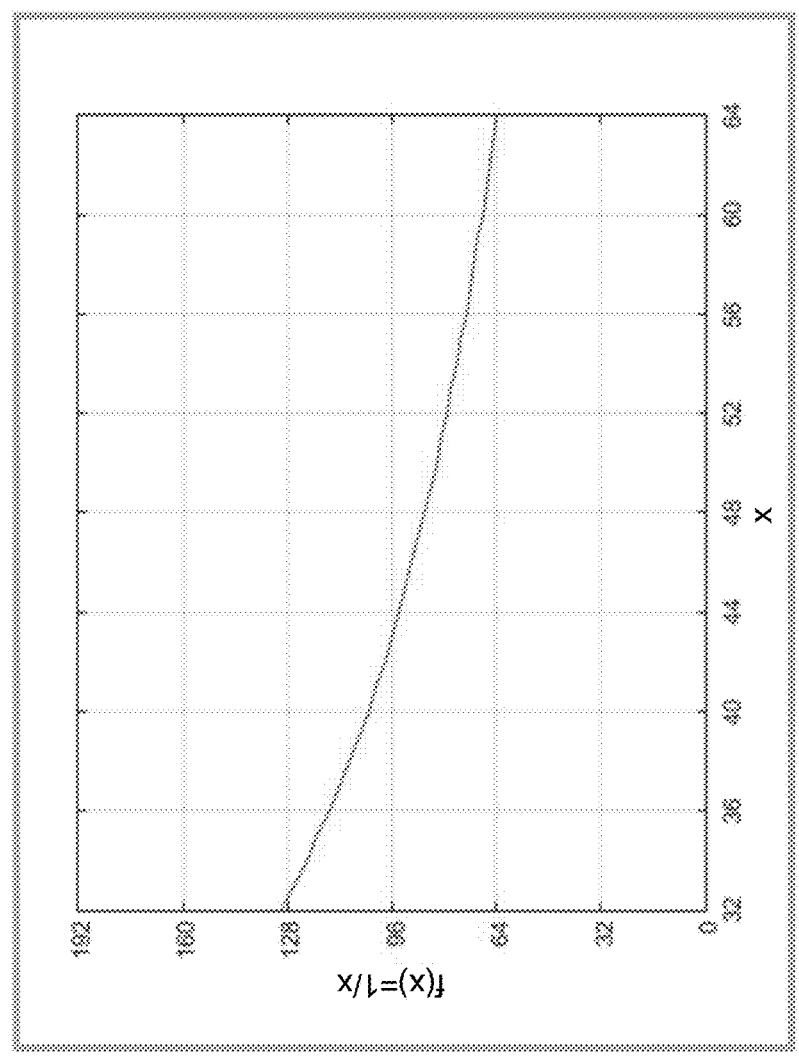
FIG. 3 illustrates a graph of showing the reciprocal function, where $n_1$ has a value of 6 (1<<$n_1$ is 64).

In some embodiments, the $LUT_{reciprocal}$ may comprise reciprocal values of p for a particular range of p values (e.g., p values between ½ and 1). For example, $n_1$ may be configured such that input to $LUT_{reciprocal}$ will always be between ½ and 1. FIG. 3 illustrates a graph of the reciprocal function, where $n_1$ and $n_0$ both have a value of 6 (1<<$n_1$ is 64).

3. When computing $TR_0$, as pixels of the slice are coded, the value of the scaling factor N may be decremented at certain threshold intervals. The next threshold at which N will be decremented may be computed as:

$$\tau = 1 << (N-1)$$

4. At each block-time, the target rate given the current state of the codec (B is the number of bits remaining in a slice, P is the number of pixels remaining in a slice) may be computed as follows.
   a. First, update the scaling factor:
      if (P<τ):
         N=N-1
         $\tau = 1 << (N-1)$
      As illustrated above, as bits in the slice are processed, when the number of remaining bits P dips below a threshold τ, the scaling factor N is decremented. In addition, the threshold τ may be updated to a new, lower value based upon the decremented scaling factor N. Subsequently, when the number of remaining bits P again reaches the threshold τ, the scaling factor N and the threshold τ may again be updated.
   b. Calculate target rate as follows:

$$r_0 = 1 << (N-1) // \text{rounding factor}$$

$$r_1 = 1 << (N+n_1-1) // \text{rounding factor}$$

$$\text{shift} = 1 << (n_0-1) // \text{since LUT is defined from } [0.5, 1]$$

$$p = ((P << n_0) + r_0) >> N$$

$$p = \text{Clip}(0, (1 << n_0) - 1, p)$$

$$TR_0 = (16 \cdot B \cdot LUT_{reciprocal}[p-\text{shift}] + r_1) >> (N+n_1)$$

For example, in a particular embodiment, the total bits remaining in a slice may be B=1244160, while the number of pixels remaining in the slice is P=207360. As such, the precomputed scaling factor N may be calculated as N=1+$\lceil \log_2(P_0) \rceil$=18.

The number of bits used to describe the granularity of the reciprocal LUT ($n_0$), and the number of bits of additional precision that the LUT entries are stored as ($n_1$) may both be 6. The LUT may thus be defined for values of the range 32 to 63 (which may become 0 to 31 after shifting). For example, as shown below, p-shift has a value of 19, which when input into the LUT yields a value of LUT[19]=80. This corresponds t0

$$\left(\frac{1}{x}\right) = \left(\frac{80}{64}\right) = 1.25 \rightarrow x = 0.8.$$

As such, the LUT is able to determine a scaled value for 1/x (where x=0.8) with 6-bit precision.

As such, the target rate may be calculated as:

$$r_0 = 1 << (N-1) = 131072 // \text{rounding factor}$$

$$r_1 = 1 << (N+n_1-1) = 8388608 // \text{rounding factor}$$

$$\text{shift} = 1 << (n_0-1) = 32 // \text{since LUT is defined from } [0.5, 1]$$

$$p = ((P << n_0) + r_0) >> N = 51$$

$p=\text{Clip}(0,(1<<n_0)-1,p)=51$ $TR_0=(16 \cdot B \cdot \text{LUT}_{reciprocal}[p-\text{shift}]+r_1)>>(N+n_1)=$
$(16 \cdot 1244160 \cdot 80+8388608)>>24=96$ Once the initial target rate $TR_0$ is approximated, the target rate for each block is calculated by adding an adjustment factor based on the current state of the buffer fullness. For example, if the buffer is nearly empty, then the target rate should be increased, and if the buffer is nearly full, the target rate should be decreased.

An adjustment LUT ($\delta(BF)$) may be precomputed and stored that associated buffer fullness values BF with adjustment values $\delta(BF)$. The adjustment LUT can be tuned or adjusted based on many codec parameters, for example, bitrate, slice size, colorspace, chroma format, etc. In general, it is preferable to store the adjustment LUT using a precision of $m_0$ and having $2^{m_0}$ entries. Since buffer fullness may be stored using $m_1$ bits (described further below), the correct adjustment LUT entry can be obtained by shifting the buffer fullness down by the required number of bits (e.g., with rounding). For example:

$\beta=(m_1-m_0)$//difference in bits between BF precision and $\delta$LUT $\text{temp}=\text{LUT}_\delta[(BF+(1<<(\beta-1)))>>\beta]$ $\delta(BF)=\text{Clip}(0,(1<<m_0)-1,\text{temp})$ These two terms (the initial target rate $TR_0$ and the adjustment value $\delta(BF)$) can be combined to give the fixed-point approximation to the target rate:

$TR_{fixed}=TR_0+\delta(BF)$

As discussed above, the fixed point target rate may be calculated using entirely fixed point arithmetic that can be implemented efficiently in hardware. For example, the calculations required to determine target rate may include addition, subtraction, bit shifting, and LUT lookups, without any division or exponential functions.

In some cases, it is desirable to allocate additional rate to blocks which may be otherwise costly or expensive to code. For example, blocks within the first line in a slice may be more expensive to code, due to having no available vertical neighbors that may be used for prediction. As such, coding efficiency for these blocks may be reduced, resulting in higher expected rate requirement. In this case, the rate for each block may be adjusted by fixing the adjustment value $\delta$ above. As an example, suppose that the nominal target rate is 96 bits/block. To increase blocks within the FLS (First Line of Slice) to 192 bits/block, an offset of $\delta=96$ may be used for the FLS only. Subsequent to this offset, for blocks within the NFLS (Non-First Line of Slice), the target rate may revert to being computed as $TR_0+\delta(BF)$.

Figure 4:
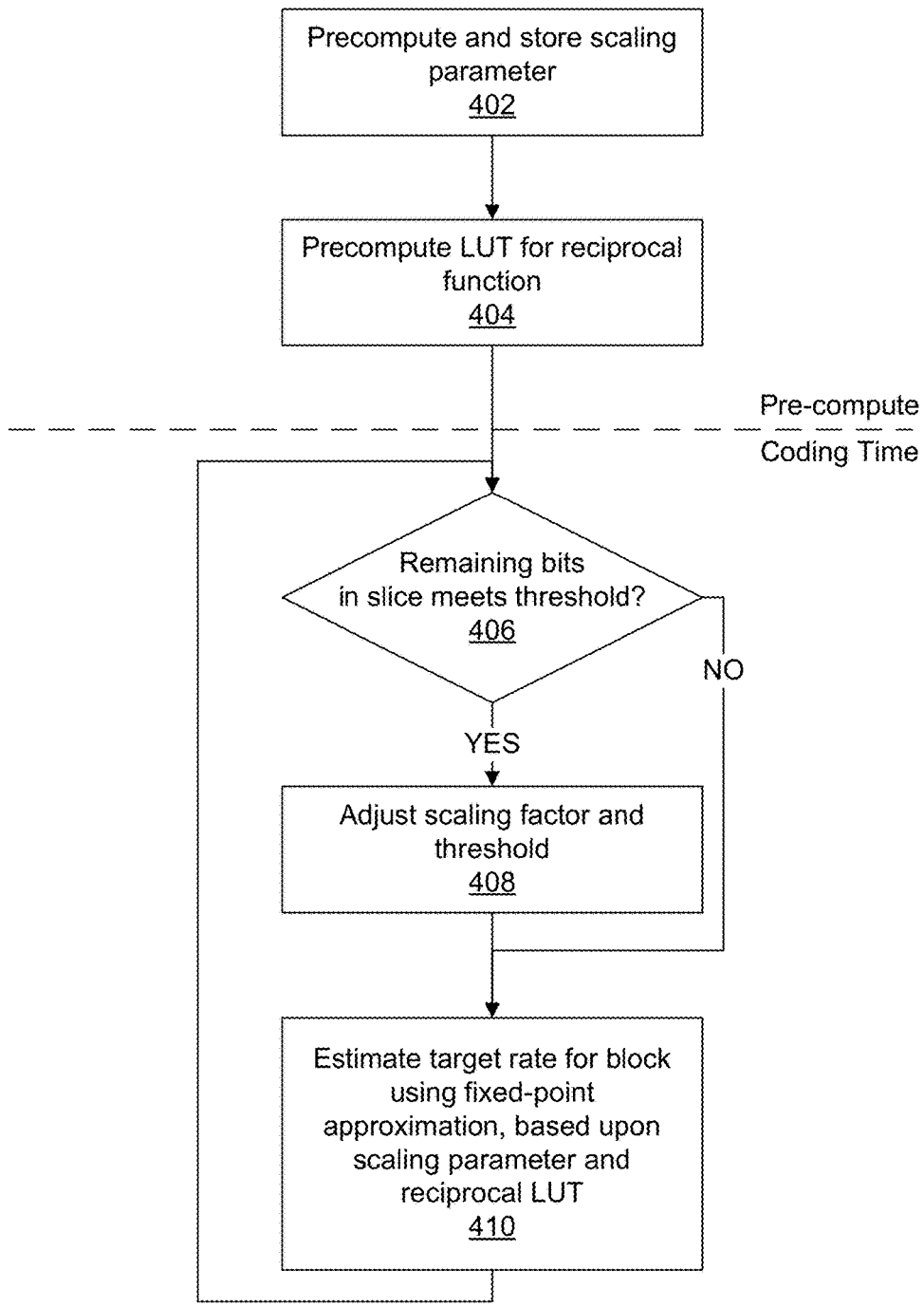
FIG. 4 illustrates a flowchart of an example method for determining target rate for a block using fixed point approximation, in accordance with some embodiments.

$\text{FLS}:TR_{fixed}=TR_0+\delta_{FLS}$ $\text{NFLS}:TR_{fixed}=TR_0+\delta(BF)$ In another embodiment, the target rate may take both FLS and buffer fullness into account. For example:

$\text{FLS}:TR_{fixed}=TR_0+\delta_{FLS}+\delta(BF)$ $\text{NFLS}:TR_{fixed}=TR_0+\delta(BF)$ FIG. 4 illustrates a flowchart of a method for determining target rate for a block using fixed point approximation, in accordance with some embodiments. At block 302, a scaling factor is precomputed and stored. The scaling factor may correspond to a constant N. In some embodiments, the scaling factor may be used to determine a threshold value corresponding to a number of pixels remaining in a slice upon which the scaling factor may be decremented.

At block 404, a LUT for calculating a reciprocal may be precomputed and stored. In some embodiments, the LUT may be stored using $n_1$ bits of precision over a range of expected values (e.g., between ½ and 1). In some embodiments, blocks 402 and 404 may correspond to pre-computation steps that may be performed prior to coding video data. For example, the scaling factor N and reciprocal LUT may be stored in the video codec's list of parameters.

During coding, a target value may be calculated for each block of the slice. At block 406, a determination may be made as to whether a number of pixels remaining in the slice to be coded is less than a threshold value. The threshold value may be determined based upon the scaling factor N (e.g., a bit shift based upon N).

If the remaining pixels in the slice is less than the threshold value, then at block 408, the scaling factor N may be updated. In some embodiments, the scaling factor may be decremented. In addition, a new threshold value may be determined based upon the updated scaling factor.

At block 410, a target rate is estimated for the block using fixed-point approximation, using the scaling factor N and the reciprocal LUT. In some embodiments, the estimated target rate may be further modified based upon an adjustment value $\delta(BF)$ based upon a level of buffer fullness. For example, if buffer fullness is high, the target rate may be reduced. On the other hand, if buffer fullness is low, the target rate may be increased. In some embodiments, the target value may be further adjusted based upon whether the current block is part of a first line of blocks of the slice. In some embodiments, blocks 406 through 410 may be repeated for each block of the slice.

As such, by precomputing and storing one or more constants (e.g., scaling factor N) and/or one or more functions using LUTs (e.g., a reciprocal LUT), parameters such as target rate may be calculated using fixed-point approximation, allowing for such calculations to be more easily performed in hardware by avoiding complex calculations such as division and exponential functions.

Flatness QP as a Function of Buffer Fullness

As discussed above in the previous section, the adjustment LUT for target rate ($\delta(BF)$) corresponds to an adjustment of the per-block target rate of the codec as a function of the buffer fullness. Using this technique, the target rate can be lower when the rate buffer is nearly full and higher when the rate buffer is nearly empty.

In the same or similar manner, the techniques can adjust the flatness QP as a function of the buffer fullness. In certain embodiments, the flatness QP may refer to the QP value that is enforced based on flatness detection, e.g., between regions of varying complexity (e.g., transition from a complex region to a flat region, from a flat region to a complex region, etc.). For example, the flatness QP can be similar to or the same as the QP or flatness QP described in U.S. patent application Ser. No. 14/685,479, filed Apr. 13, 2015, which is incorporated herein by reference in its entirety, and general QP adjustment scheme can be similar to or the same as the QP adjustment scheme discussed in U.S. Provisional Application No. 62/146,898, filed Apr. 13, 2015, which is incorporated herein by reference in its entirety.

In particular, when transitioning from a flat-to-complex or complex-to-flat region, the QP may be adjusted such that visual artifacts do not appear at such boundaries. However, the QP to which the codec is changed may depend on the buffer fullness. For example, in a very difficult or complex region, a moderate QP value may need to be used, as the rate buffer is in a more taxed state. According to certain aspects, it is important to note that the moderate QP value can be selected such that a visual artifact(s) are not introduced at the transition from flat to complex or vice-versa. On the other hand, if the rate buffer is nearly empty, then a very low QP could be used to minimize distortion at the cost of higher rate. A $\text{LUT}_{flatnessQP}$ may be precomputed and stored that associates buffer fullness values with QP adjustment values.

In a similar fashion as $\delta(BF)$ above, the buffer fullness may be shifted down by $(m_1-m_0)$ bits, where $m_1$ is the number of bits for buffer fullness and $m_0$ is the number of bits used to define the flatness QP adjustment LUT. The number of bits of the LUT $m_0$ and the values contained in the LUT may be tuned or adjusted depending on the configuration of the codec. For example, they may be changed depending on factors such as: compressed bit-rate, RGB/YCbCr input, chroma-subsampling, etc. In this manner, the flatness QP can be determined using fixed-point approximation.

$\beta=(m_1-m_0)$//difference in bits between BF precision and flatness QP LUT temp=$\text{LUT}_{flatnessQP}[(BF+(1<<(\beta-1)))>>\beta]$ FlatnessQp(BF)=Clip(0,$(1<<m_0)-1$,temp)

Figure 5:
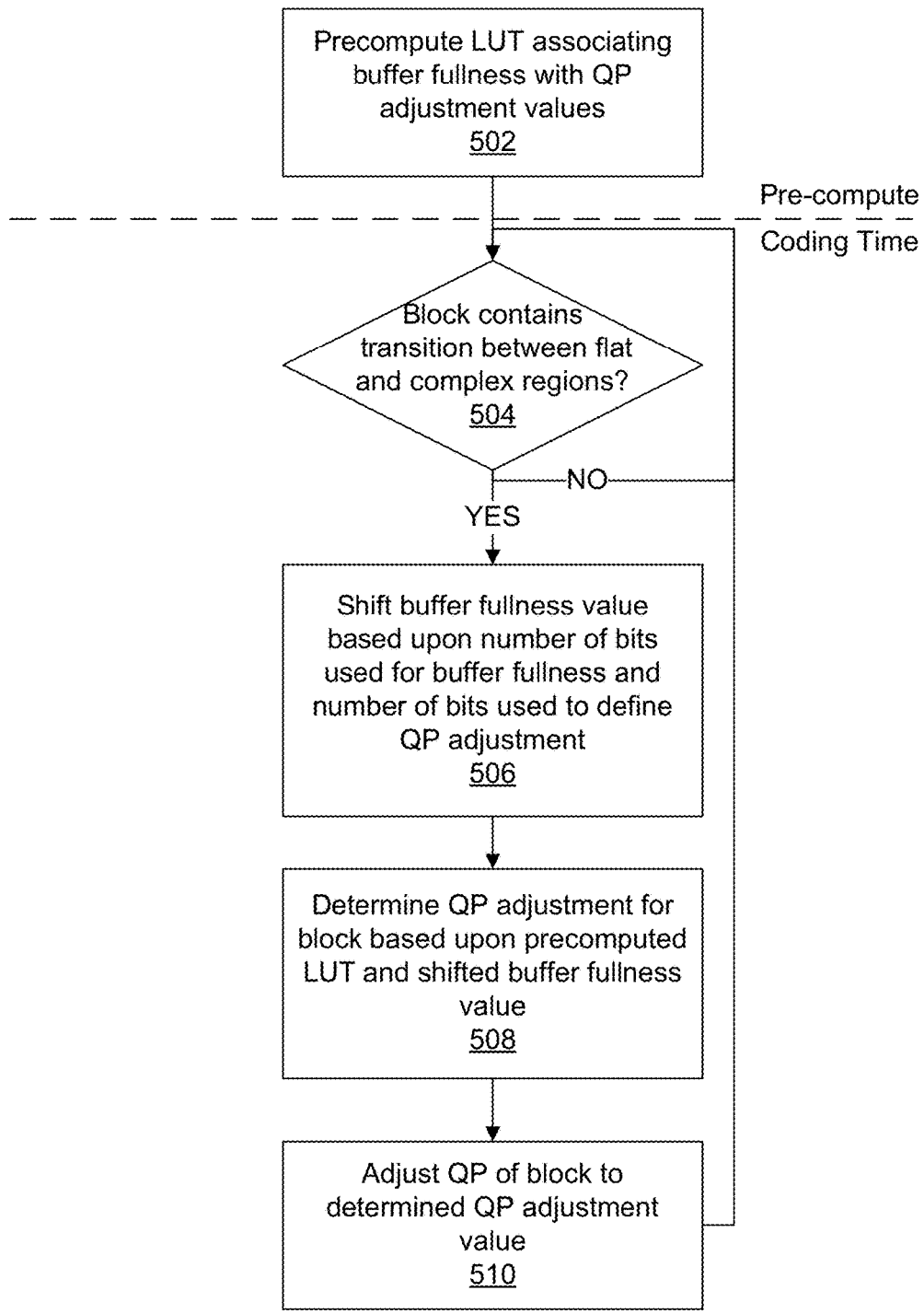
FIG. 5 illustrates a flowchart of an example method for determining flatness QP for a block using fixed point approximation, in accordance with some embodiments.

FIG. 5 illustrates a flowchart of a method for determining flatness QP for a block using fixed point approximation, in accordance with some embodiments. At block 502, a LUT or other data structure that associated buffer fullness values with QP adjustment values is precomputed and stored. At block 504, during coding time for a particular block of the slice, a determination is made as to whether the block contains a transition between a flat and a complex region. In some embodiments, the determination may be made by determining a complexity value associated with the block, and comparing the determined complexity value with one or more thresholds. In some embodiments, a complexity value of one or more neighboring blocks may also be considered. If it is determined that no transition exists within the block, the QP value of the block may be set normally, instead of being set to a flatness QP adjustment value. The process may then return to block 504 for a subsequent block of video data to be coded.

On the other hand, if it is determined that a transition exists within the block, then a flatness QP adjustment may need to be determined. At block 506, the current buffer fullness value is shifted based upon a number of bits used for buffer fullness and a number of bits used to define QP adjustment values. At block 506, the QP adjustment value is determined using the precomputed LUT and the shifted buffer fullness value. In addition, the QP adjustment value may be clipped between 0 and a maximum value of the number of bits used to define QP adjustment values.

At block 510, the QP value associated with the block may be set to the determined QP adjustment value. The process may then return to block 504 for a subsequent block of video data to be coded.

Although FIG. 5 illustrates determining whether a block contains a transition before determining a flatness QP adjustment value, it is understood that in other embodiments, the flatness QP adjustment value may be determined before analyzing the complexity of the block.

Buffer Fullness

Figure 6:
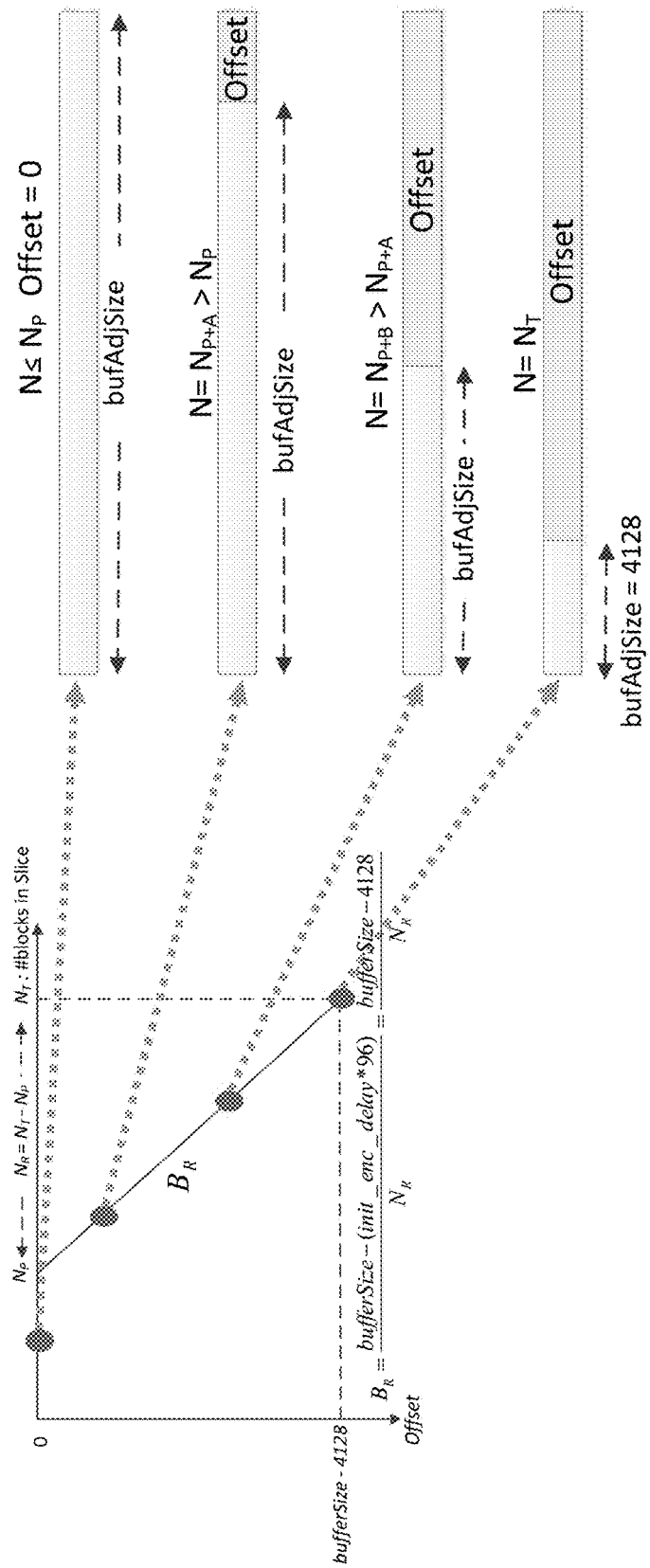
FIG. 6 illustrates how bufAdjSize may change as blocks of the slice are coded.

Buffer fullness that is calculated based on Eq. (1) above is not easily implementable in hardware as it requires a division operation. In particular, the denominator value in Eq. (1), bufAdjSize, changes in value depending on the position of the block in the slice. As such, it may be impractical to precompute division values for computing buffer fullness. For example, FIG. 6 illustrates how bufAdjSize may change as blocks of the slice are coded. For example, for a number of block up to a numBlocksTh threshold value, bufAdjSize may be the same as BufferMaxSize (e.g., offset=0). However, after the threshold number of blocks are coded, bufAdjSize may decrease as additional blocks are coded.

In order to calculate buffer fullness easily in hardware, the offset value can be moved to the numerator from the denominator, so that the denominator bufferAdjSize becomes BufferMaxSize, which is a constant throughout the slice. For example, Eq. (1) is modified as:

$$BF = \frac{((bufferCurrentSize + \text{offset}) \cdot 100) + (bufferMaxSize \gg 1)}{bufferMaxSize} \quad (\text{eq. 3})$$

The offset value in Eq. (3) is calculated in the same way as described above with regards to Eq. (1). In one alternative, (BufferMaxSize>>1) in the numerator of Eq. (3) may be omitted. The modified method to calculate buffer fullness based on Eq. (3) will result in 100% buffer fullness, when BufferCurrentSize=maxBufferBitsAtSliceEnd at the end of the slice.

It is understood that while Eq. (3) is not equivalent to Eq. (1), the general behavior of BF as calculated with Eq. (3) will be largely similar to that of Eq. (1) for different blocks within the slice.

Because, the denominator in Eq. (3) can be a constant value throughout the slice, buffer fullness BF can be calculated using fixed-point approximation.

For example, a fixed-point approximation for Eq. (3) can be determined as in Eq. (4) below. Factor a, based upon the constant value BufferMaxSize, may be precomputed and stored, for example, in the codec's picture parameter set (PPS).

Given the set of following parameters,

BfRangeBits: number of bits used to represent the buffer fullness

BfScaleBits: precision to calculate buffer fullness

An integer value of buffer fullness (denoted as $BF^i$) ranging from 0 to $(2^{BfRangeBits})-1$ may be calculated as:

$BF^i=(a \cdot (\text{BufferCurrentSize}+\text{offset}))>>\text{BfScaleBits}$ (eq. 4)

where $$a = \frac{(1 \ll (BfScaleBits + BfRangeBits))}{BufferMaxSize},$$

which can be stored in the codec's parameter set.

In one alternative to Eq. (4), before right shift, a value of (BfScaleBits>>1) can be added at the numerator in order to round to the nearest integer. In some embodiments, parameters BfRangeBits and/or BfScaleBits may be scalable, such that the number of bits and precision for calculating buffer fullness may be adjusted. For example, a may pre-calculated as $$\frac{1}{BufferMaxSize},$$

and then bit-shifted based upon the values of BfRangeBits and BfScaleBits.

Figure 7:
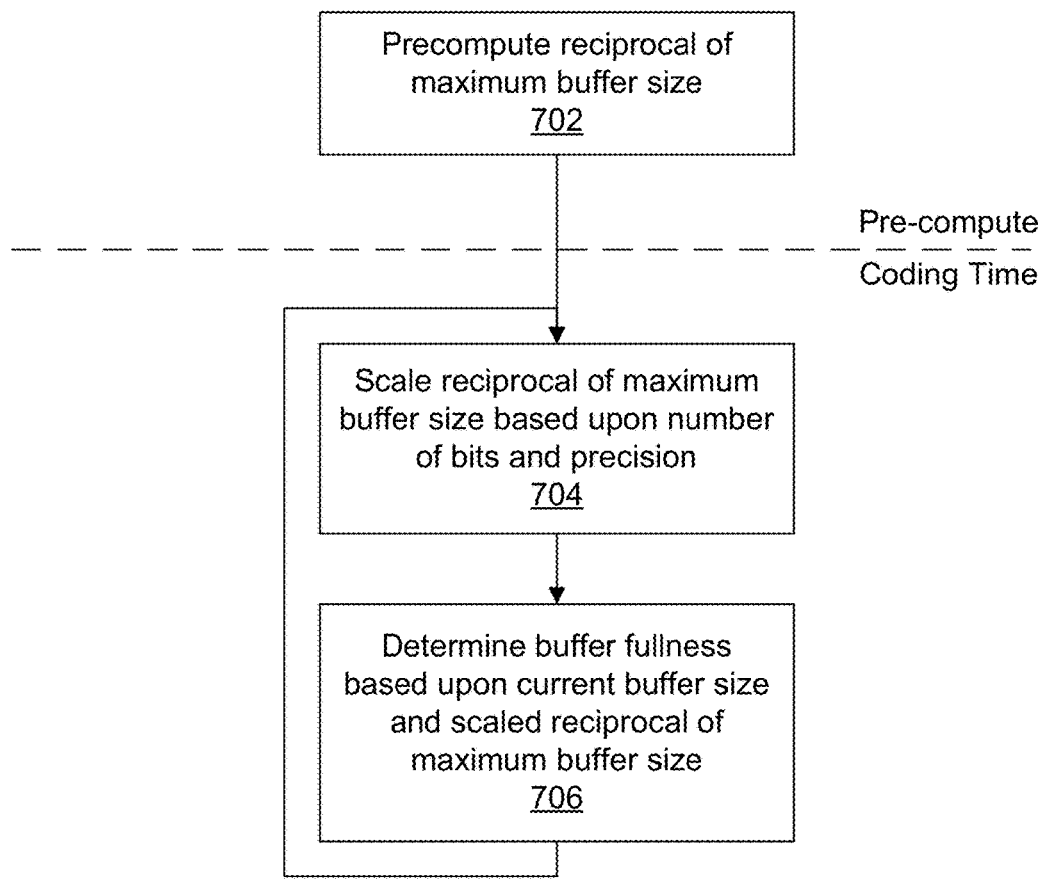
FIG. 7 illustrates a flowchart of an example process for determining a buffer fullness, in accordance with some embodiments.

FIG. 7 illustrates a flowchart of a process for determining a buffer fullness, in accordance with some embodiments. At block 702, a reciprocal of a maximum buffer size may be precomputed and stored. For example, the reciprocal may be stored as part of the video codec's parameter set.

At block 704, the reciprocal of maximum buffer size may be scaled based upon a number of bits for representing buffer fullness and/or a precision value for calculating buffer fullness. In some embodiments, the number of bits and precision may be constants and may be precomputed with the reciprocal of maximum buffer size at block 702.

At block 706, buffer fullness may be determined based upon a current buffer size and the scaled reciprocal of maximum buffer size. By basing the buffer fullness measurement on maximum buffer size instead of adjusted buffer size (as in Eq. (1)), the buffer fullness may be calculated using fixed point approximation instead of floating point, allowing for easier implementation in hardware.

Lagrangian Parameter for Bitrate-λ(Bitrate)

As discussed above, a lambda or Lagrangian parameter may be adjusted as a function of the bitrate of a given block (e.g., the number of bits needed to code the block in a certain mode). In one embodiment, the Lagrangian parameter for bitrate may be determined using fixed-point approximation as described below. Previously, the Lagrangian parameter may be calculated as:

$$\lambda(x) = d \cdot 2^{\left(\frac{(a \cdot x - b)}{c}\right)}$$

where {a, b, c, d} are tunable or adjustable parameters and $$x = \frac{bits}{maxBits},$$

where bits is the number of bits used to code a block (also referred to as the bitrate for the block, and which may be based upon a target rate, a QP value, and/or other parameters), and maxBits is the worst case bits/block. This calculation may be done using floating point arithmetic, which is not well suited to hardware implementation.

In order to compute the Lagrangian parameter as a function of the bitrate using fixed point arithmetic, a LUT ($LUT_\lambda$) may be used. In addition, a scaling factor c can be precomputed and stored in the codec's parameter set. The scaling factor can be used to transform the denominator maxBits (e.g., max bits per block) to a power-of-2, such that bitshifting can be used rather than division.

Given the following parameters:
$n_3$: total precision for lambda calculation
$n_4$: $LUT_\lambda$, is of size $(1<<n_4)$ The algorithm for computing λ(bitrate) is as follows:
1. Precompute $LUT_\lambda$ using exponential function described above.
   a. In one embodiment, the function can be sampled uniformly in order to generate the LUT.
   b. In another embodiment, the function may be sampled non-uniformly such that areas of the function with higher dynamic range are sampled more densely, while areas with less range are sampled more sparsely.

2. Precompute the scaling factor c as:

$$c = \frac{((1 \ll n_3) + (maxBits \gg 1))}{maxBits}$$

3. Finally, look up the lambda value in the LUT:

$$\lambda(bits) = LUT_\lambda[(bits \cdot c) >> (n_3 - n_4)]$$

In an alternative approach to the above, the LUT may be stored with a reduced number of entries (e.g., 16 instead of 64), and then bilinear interpolation can be used to approximate the value. This may require slightly more logic to determine the λ value; however, fixed-point interpolation can be used, which will limit the worst-case complexity. The trade-off would be added logic in exchange for reduced storage of LUT tables.

Figure 8:
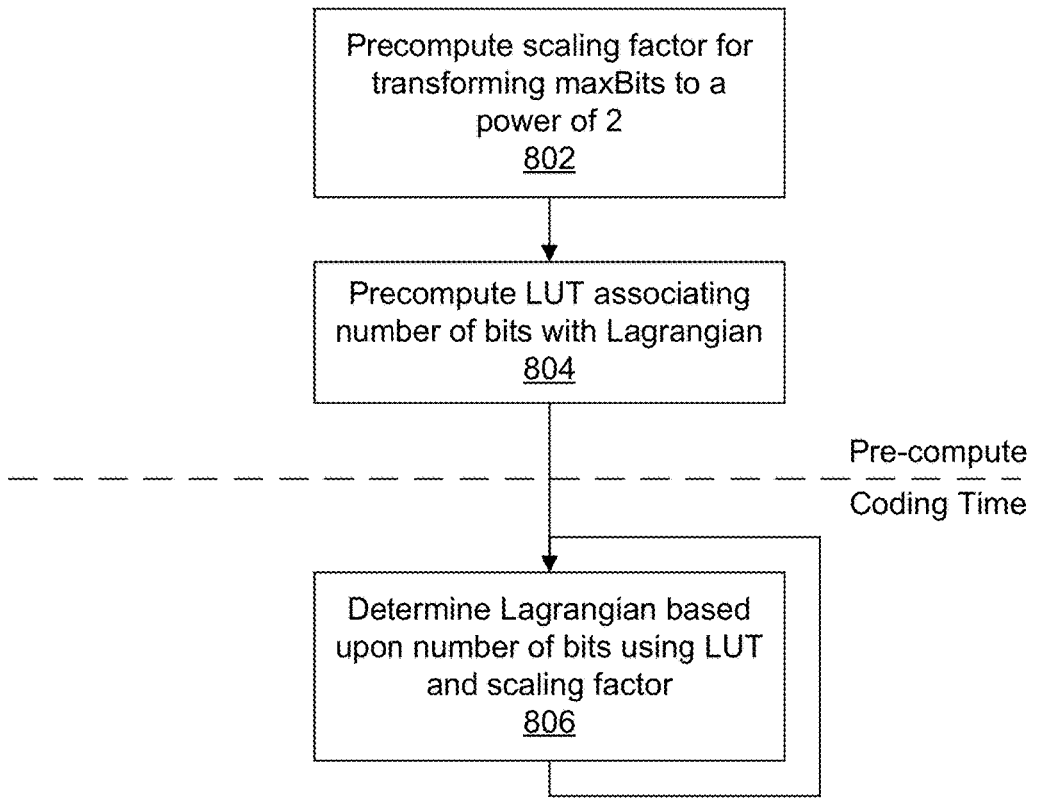
FIG. 8 illustrates a flowchart of an example process for determining a Lagrangian parameter for bitrate, in accordance with some embodiments.

FIG. 8 illustrates a flowchart of a process for determining a Lagrangian parameter for bitrate, in accordance with some embodiments. At block 802, a scaling factor c is precomputed. The scaling factor c may be configured to the constant maxBits scaled by c will be a power of 2, allowing for dividing by maxBits to be performing using a bit shift operation.

At block 804, an LUT or other data structure associating a number of bits used to code a block with a bitrate Lagrangian. In some embodiments, the number of bits may be scaled based upon the scaling factor c, a precision factor, and an indication of a size of the LUT or data structure.

During coding time, at block 806, the bitrate Lagrangian for a block is determined, based upon the number of bits used to code the block, and the precomputed LUT and scaling factor c.

Lagrangian Parameter for Buffer Fullness-λ(BF)

As discussed above, the Lagrangian parameter for a block may be adjusted based upon a measure of buffer fullness. According to certain aspects, the range for buffer fullness ($BF^i$) is: $BF^i \in [0, (2^{BfRangeBits}) - 1]$. Therefore, x, calculated as $$x = \frac{BF}{100}$$

in Eq. (2), may be rewritten as:

$$x = \frac{BF^i}{(2^{BfRangeBits}) - 1}$$

Using the above, Eq. 2 can be modified as follows:

$$\lambda(x) = (2^{ScaleBits}) \cdot \text{Max}\left(\Lambda, a_1 \cdot 2^{\frac{((x \cdot b_1) - c_1)}{d_1}}\right) \quad (eq. 5)$$

In order to increase the precision, the above equation may be multiplied by a constant scaling factor $2^{ScaleBits}$, where ScaleBits is a positive integer. In some embodiments, the lambda value or Lagrangian parameter for buffer fullness can be determined using fixed-point approximation as described below.

In one embodiment, in order to calculate the lambda based on buffer fullness using fixed point arithmetic, a look up table (LUT) method may be used. For instance, a LUT may be used if $d_1$ in Eq. (5) is not a power of 2. In one example, LUT can be constructed using Eq. (5) by linearly sampling $BF^i$ using $l_b$ bits to create a LUT with a size of $2^{\wedge}(l_b)$. Once the LUT is constructed, the buffer fullness lambda can be inferred from the LUT using an index calculated as index= $(BF^i+\text{offset})\text{>>scale}$, where scale=BfRangeBits$-l_b$ and offset=1<<(scale-1). In some embodiments, the index may be calculated as index=$(BF^i)$>>scale. Finally, in some embodiments, if necessary, the calculated index value can be clipped to a respective maximum and minimum value of $2^{l_b}-1$ and 0 in order to ensure a valid entry in the LUT.

In another example, a LUT can be constructed based on non-linear sampling, where $BF^i$ can be sampled with non-uniform step sizes. In one example, the LUT can be sampled more coarsely at lower ranges and more densely at higher ranges, e.g., step size increases when moving away from zero. In yet another example, denser sampling can be at a lower range(s) and coarse sampling at a higher range(s).

In another alternative, the Eq. (5) may be modified such that the lambda can be easily computed using fewer operations, so that lambda can be calculated on the fly. For example, the equation may be modified such that it involves only multiplication with integer numbers, shift operation (both right and left shift), and addition. In other words, the modified equation does not contain any division operation. An advantage of this method is that it can reduce LUT storage and eliminate memory access operations with LUT. In one example, if $d_1$ is a power of 2, the function $\lambda(x)$ can easily computed using fixed-point arithmetic.

In this manner, the techniques can reduce or eliminate use of operations that lead to complexity, difficulty, and/or increased cost in hardware implementation, for example, by using fixed-point approximation. Such operations can involve divisions, complicated or complex functions or computations, floating point arithmetic, etc. Hardware complexity of the proposed ADSC codec or model can be greatly reduced using the fixed-point approximations above.

All examples and embodiments described in this disclosure may be implemented separately or in combination, depending on the embodiment. Certain features of the examples and the embodiments may be omitted or changed, and other features may be added to the examples and the embodiments, depending on the embodiment.

Figure 9:
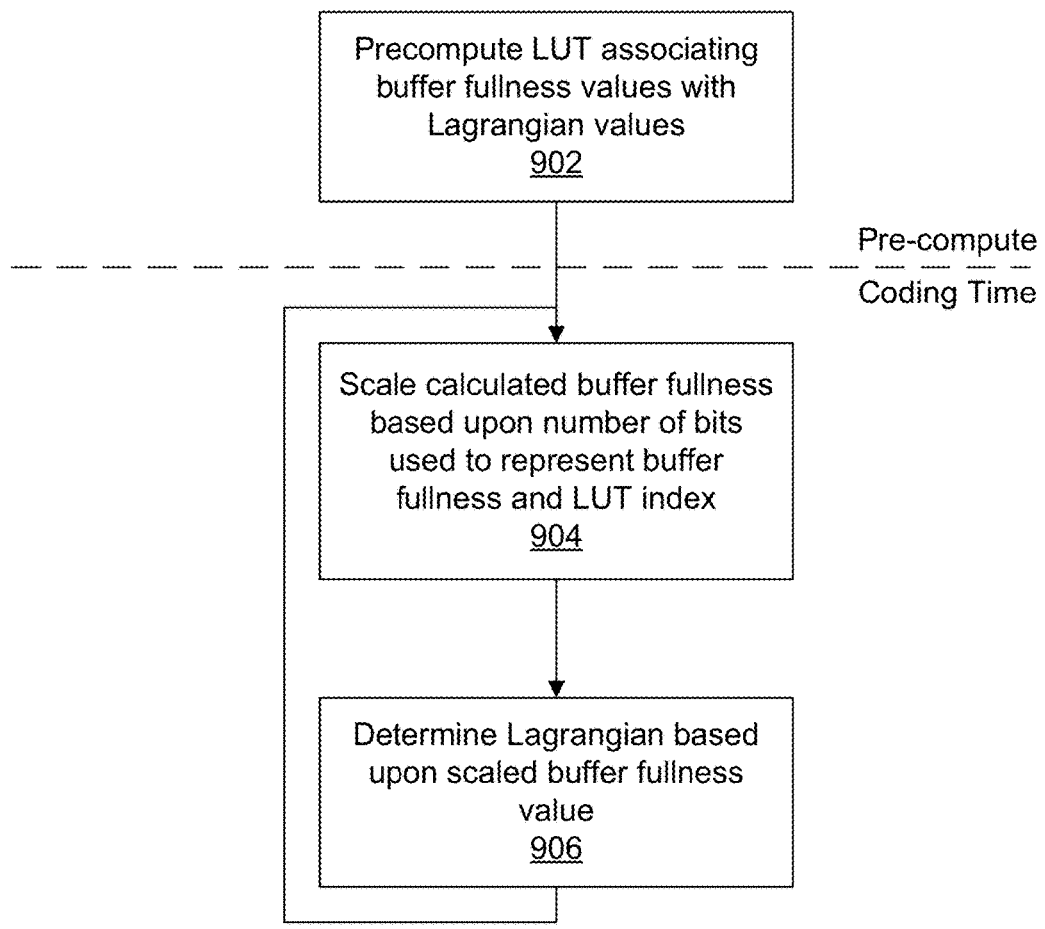
FIG. 9 illustrates a flowchart of a process for determining a Lagrangian parameter for buffer fullness, in accordance with some embodiments.

FIG. 9 illustrates a flowchart of a process for determining a Lagrangian parameter for buffer fullness, in accordance with some embodiments. At block 902, an LUT or other data structure is precomputed and stored. The LUT or other data structure may associate buffer fullness ($BF^i$) with Lagrangian parameters for buffer fullness.

At block 904, during coding time, a calculated buffer fullness value (e.g., using the process illustrated in FIG. 7) may be scaled based upon a number of pixels used to represent the buffer fullness value and/or an indication of a size of the LUT or data structure (e.g., number of pixels of LUT index). At block 906, the scaled buffer fullness value is used as an input to the LUT or data structure (e.g., LUT index) to determine the Lagrangian parameter for buffer fullness.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for coding video data, comprising:
a memory for storing the video data, the memory including a buffer; and
a hardware processor operationally coupled to the memory and configured to:
determine and store a scaling parameter based upon a total number of pixels within a slice of video data;
determine and store a data structure associating a plurality of input values with their reciprocal values;
receive the video data to be coded, the video data comprising at least one slice divided into a plurality of blocks;
determine a threshold value based upon the stored scaling parameter;
for a block of the slice to be coded, in response to a determination that a number of remaining pixels in the slice is less than the threshold value, update the scaling parameter and determine an updated threshold value based upon the scaling factor; and
perform one or more fixed-point approximation operations to determine a target rate for the block, based upon a reciprocal value associated with the number of remaining pixels scaled based upon the scaling factor, wherein the reciprocal value is determined using the stored data structure.

2. The apparatus of claim 1, wherein the data structure comprises a lookup table (LUT).

3. The apparatus of claim 1, wherein the hardware processor is further configured to adjust the determined target rate by an amount based upon a measure of buffer fullness.

4. The apparatus of claim 3, wherein the adjustment amount is determined based using a lookup table (LUT).

5. The apparatus of claim 1, wherein the hardware processor is further configured to adjust the determined target rate based upon whether the block is located on a first line of the slice.

6. The apparatus of claim 1, wherein the hardware processor is further configured to scale the reciprocal value based upon a number of bits remaining in the slice.

7. A computer implemented method for determining target rates for coding blocks of video data, comprising:
determining and storing a scaling parameter based upon a total number of pixels within a slice of video data;
determining and storing a data structure associating a plurality of input values with their reciprocal values;
receiving the video data to be coded, the video data comprising at least one slice divided into a plurality of blocks;
determining a threshold value based upon the stored scaling parameter;
for a block of the slice to be coded, in response to a determination that a number of remaining pixels in the slice is less than the threshold value, updating the scaling parameter and determining an updated threshold value based upon the scaling factor; and
performing one or more fixed-point approximation operations to determine a target rate for the block, based upon a reciprocal value associated with the number of remaining pixels scaled based upon the scaling factor, wherein the reciprocal value is determined using the stored data structure.

8. The computer-implemented method of claim 7, wherein the data structure comprises a lookup table (LUT).

9. The computer-implemented method of claim 7, further comprising adjusting the determined target rate by an amount based upon a measure of buffer fullness.

10. The computer-implemented method of claim 9, wherein the adjustment amount is determined based using a lookup table (LUT).

11. The computer-implemented method of claim 7, further comprising adjusting the determined target rate based upon whether the block is located on a first line of the slice.

12. The computer-implemented method of claim 7, further comprising scaling the reciprocal value based upon a number of bits remaining in the slice.

13. An apparatus comprising:
means for determining and storing a scaling parameter based upon a total number of pixels within a slice of video data;
means for determining and storing a data structure associating a plurality of input values with their reciprocal values;
means for receiving the video data to be coded, the video data comprising at least one slice divided into a plurality of blocks;
means for determining a threshold value based upon the stored scaling parameter;
for a block of the slice to be coded, in response to a determination that a number of remaining pixels in the slice is less than the threshold value, means for updating the scaling parameter and determining an updated threshold value based upon the scaling factor; and
means for performing one or more fixed-point approximation operations to determine a target rate for the block, based upon a reciprocal value associated with the number of remaining pixels scaled based upon the scaling factor, wherein the reciprocal value is determined using the stored data structure.

14. The apparatus of claim 13, wherein the data structure comprises a lookup table (LUT).

15. The apparatus of claim 13, further comprising means for adjusting the determined target rate by an amount based upon a measure of buffer fullness.

16. The apparatus of claim 15, wherein the adjustment amount is determined based using a lookup table (LUT).

17. The apparatus of claim 13, further comprising means for adjusting the determined target rate based upon whether the block is located on a first line of the slice.

18. The apparatus of claim 13, further comprising means for scaling the reciprocal value based upon a number of bits remaining in the slice.

19. A non-transitory computer readable storage medium having stored thereon video data relating to a slice of an image, the slice comprising one or more blocks, wherein the storage medium further has stored thereon instructions that, when executed, cause a processor of a device to:
   determine and store a scaling parameter based upon a total number of pixels within a slice of video data;
   determine and store a data structure associating a plurality of input values with their reciprocal values;
   receive the video data to be coded, the video data comprising at least one slice;
   determine a threshold value based upon the stored scaling parameter;
   for a block of the slice to be coded, in response to a determination that a number of remaining pixels in the slice is less than the threshold value, update the scaling parameter and determine an updated threshold value based upon the scaling factor; and
   perform one or more fixed-point approximation operations to determine a target rate for the block, based upon a reciprocal value associated with the number of remaining pixels scaled based upon the scaling factor, wherein the reciprocal value is determined using the stored data structure.

20. The non-transitory computer readable storage medium of claim 19, wherein the data structure comprises a lookup table (LUT).

21. The non-transitory computer readable storage medium of claim 19, wherein the storage medium further has stored thereon instructions that, when executed, cause the processor to adjust the determined target rate by an amount based upon a measure of buffer fullness.

22. The non-transitory computer readable storage medium of claim 21, wherein the adjustment amount is determined based using a lookup table (LUT).

23. The non-transitory computer readable storage medium of claim 19, wherein the storage medium further has stored thereon instructions that, when executed, cause the processor to adjust the determined target rate based upon whether the block is located on a first line of the slice.

24. The non-transitory computer readable storage medium of claim 19, wherein the storage medium further has stored thereon instructions that, when executed, cause the processor to scale the reciprocal value based upon a number of bits remaining in the slice.

25. An apparatus for coding video data, comprising:
   a memory for storing the video data, the memory including a buffer; and
   a hardware processor operationally coupled to the memory and configured to:
      determine and store a first parameter value based upon a reciprocal of a maximum buffer size;
      receive the video data to be coded, the video data comprising at least one slice divided into a plurality of blocks;
      for a block of the slice to be coded, scale the first parameter based upon a first value indicating a number of bits used to represent buffer fullness, and a second value indicating precision for which to calculate buffer fullness; and
      perform one or more fixed-point approximation operations to determine a buffer fullness value for the block, based upon the scaled first parameter, a current size of the buffer, a buffer offset value based upon a position of the block within the slice, and the second value indicating precision for which to calculate buffer fullness.

26. The apparatus of claim 25, wherein the hardware processor is further configured to:
   determine and store a data structure associating buffer fullness values with Lagrangian values for buffer fullness values;
   receive the video data to be coded, the video data comprising at least one slice divided into a plurality of blocks;
   for a block of the slice to be coded, scale a calculated buffer fullness value of the block based upon a first parameter indicating a number of bits used to code the buffer fullness value and a second parameter indicating a number of bits used to code an index of the data structure; and
   perform one or more fixed-point approximation operations to determine a Lagrangian value for the buffer fullness value using the stored data structure and the scaled buffer fullness value.

27. An apparatus for coding video data, comprising:
   a memory for storing the video data, the memory including a buffer; and
   a hardware processor operationally coupled to the memory and configured to:
      determine and store a data structure associating buffer fullness values with quantization parameter (QP) adjustment values;
      receive the video data to be coded, the video data comprising at least one slice divided into a plurality of blocks;
      for a block of the slice to be coded, determine whether the block contains a transition between a complex region and a flat region, wherein complex regions have a higher complexity in comparison to flat regions;
      in response to a determination that the block contains a transition, shift a buffer fullness value based upon a number of bits used to code the buffer fullness value and a number of bits to be used to code a QP adjustment value;
      perform one or more fixed-point approximation operations to determine a QP adjustment value for the block, based upon the stored data structure and the shifted buffer fullness value; and
      set a QP of the block to the determined QP adjustment value.

28. An apparatus for coding video data, comprising:
   a memory for storing the video data; and
   a hardware processor operationally coupled to the memory and configured to:
      determine and store a first scaling parameter based upon a maximum number of bits that can be used to code a block of video data;
      determine and store a data structure associating numbers of bits used to code blocks of video data with Lagrangian parameters for bitrate;
      receive the video data to be coded, the video data comprising at least one slice divided into a plurality of blocks;

for a block of the slice to be coded, perform one or more fixed-point approximation operations determine a Lagrangian for a bitrate of the block using the data structure, based upon a number of bits to code the block adjusted by the first scaling parameter.

29. An apparatus for coding video data, comprising:

a memory for storing the video data, the memory including a buffer; and a hardware processor operationally coupled to the memory and configured to:

determine and store a data structure associating buffer fullness values with Lagrangian values for buffer fullness values;

receive the video data to be coded, the video data comprising at least one slice divided into a plurality of blocks;

for a block of the slice to be coded, scale a calculated buffer fullness value of the block based upon a first parameter indicating a number of bits used to code the buffer fullness value and a second parameter indicating a number of bits used to code an index of the data structure; and perform one or more fixed-point approximation operations to determine a Lagrangian value for the buffer fullness value using the stored data structure and the scaled buffer fullness value.

* * * * *